Sept. 22, 1936.                W. K. STOKES                2,055,053
                            LIVE ROLLER CONVEYER
                           Filed Aug. 8, 1932          4 Sheets-Sheet 1
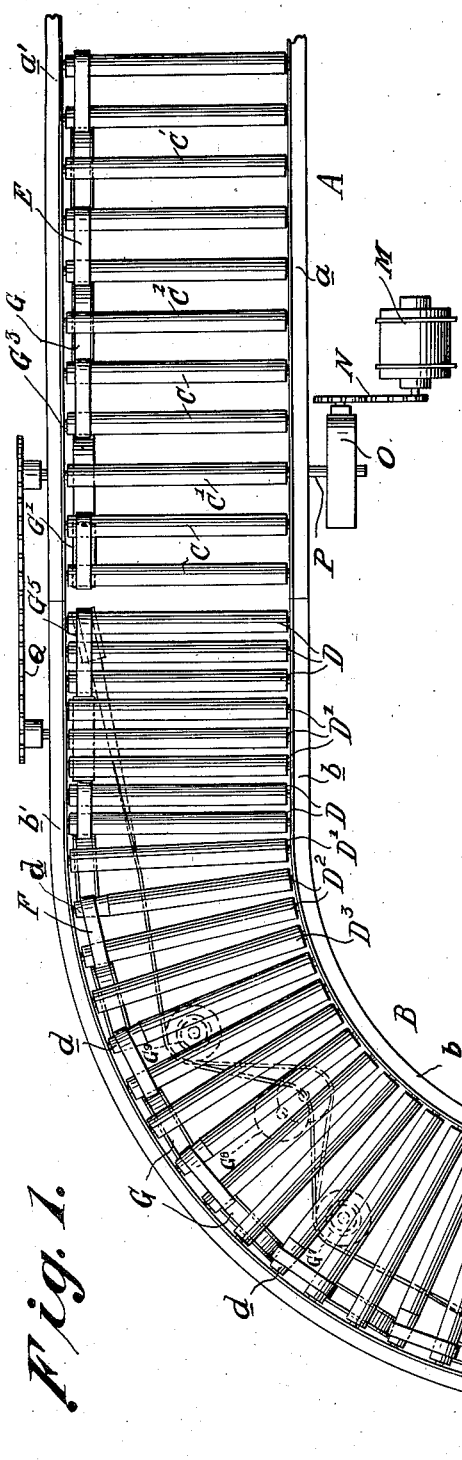
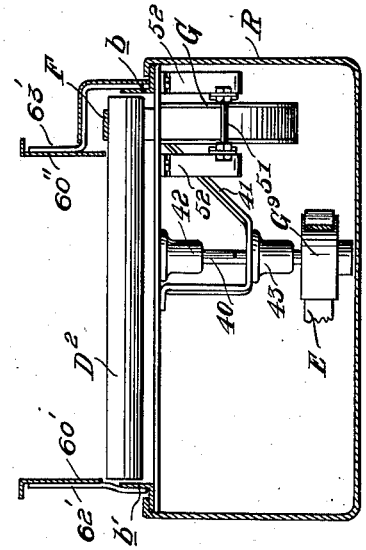
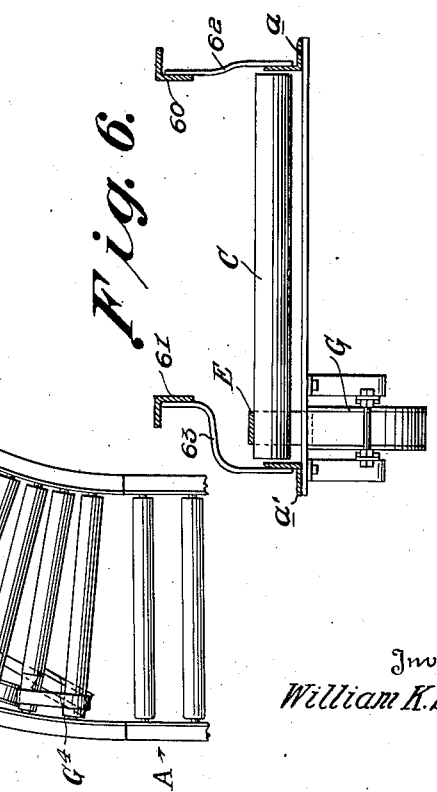
Inventor
William K. Stokes
By C. J. Stockman
                Attorney Sept. 22, 1936.  W. K. STOKES  2,055,053
LIVE ROLLER CONVEYER
Filed Aug. 8, 1932  4 Sheets-Sheet 2
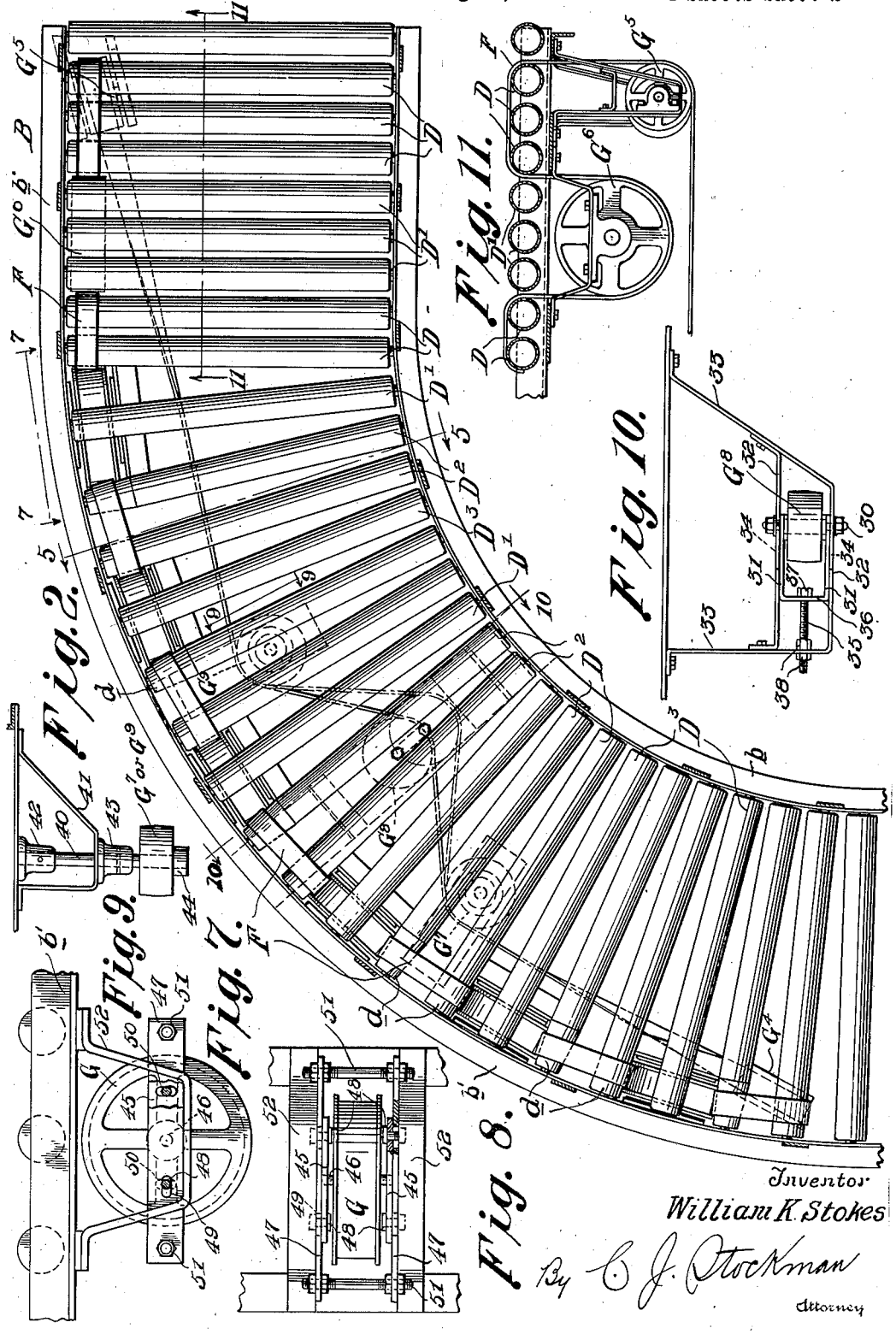
Inventor
William K. Stokes
By C. J. Stockman
Attorney Sept. 22, 1936.  W. K. STOKES  2,055,053
LIVE ROLLER CONVEYER
Filed Aug. 8, 1932  4 Sheets-Sheet 3
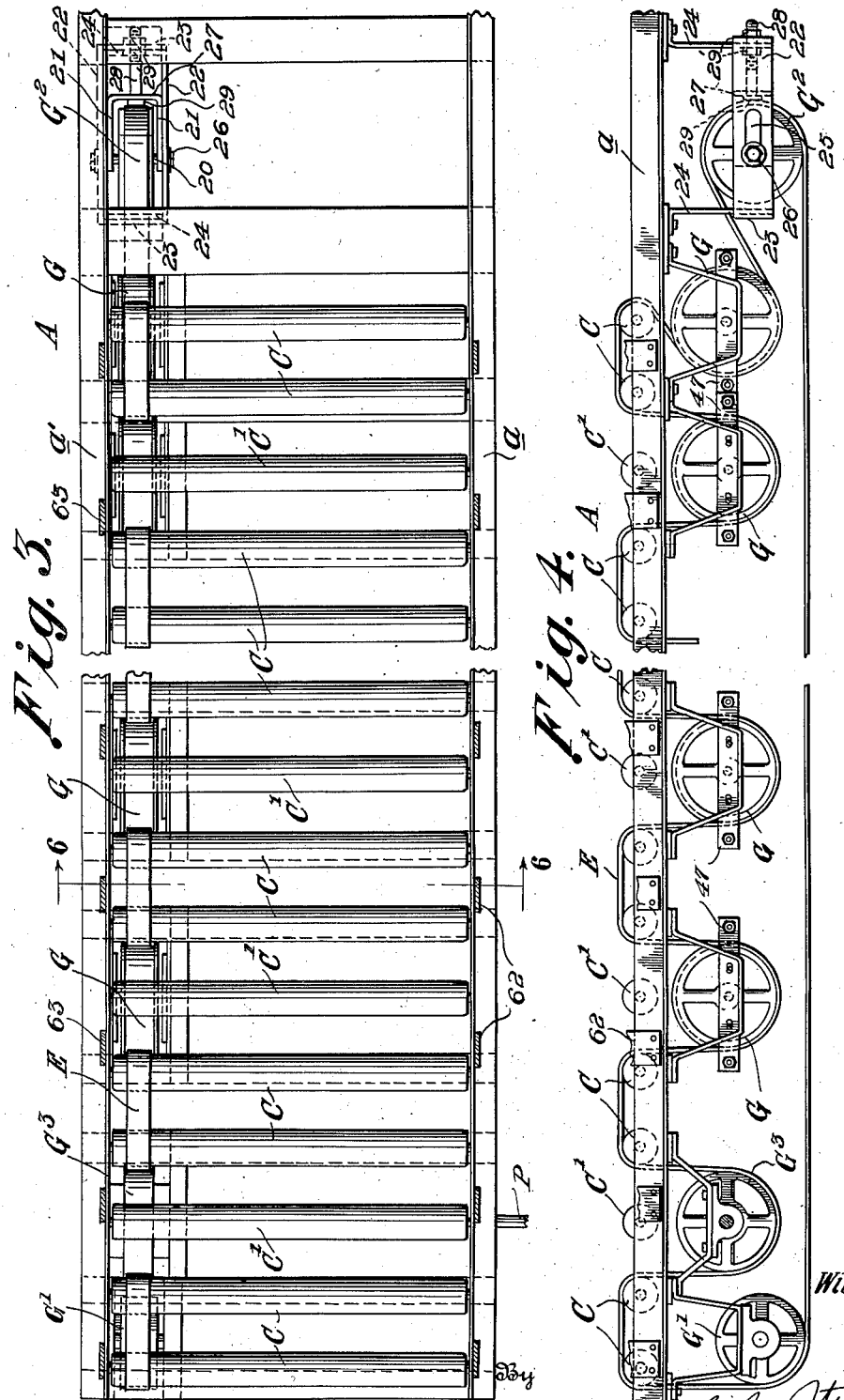

Sept. 22, 1936.   W. K. STOKES   2,055,053
LIVE ROLLER CONVEYER
Filed Aug. 8, 1932   4 Sheets-Sheet 4
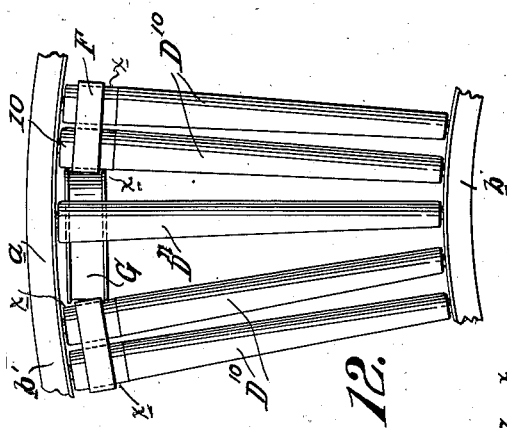
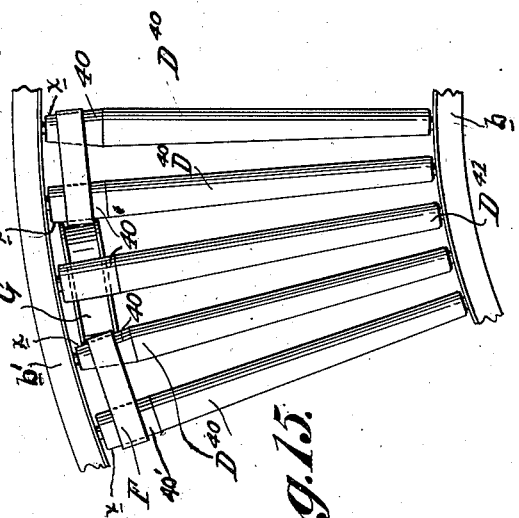
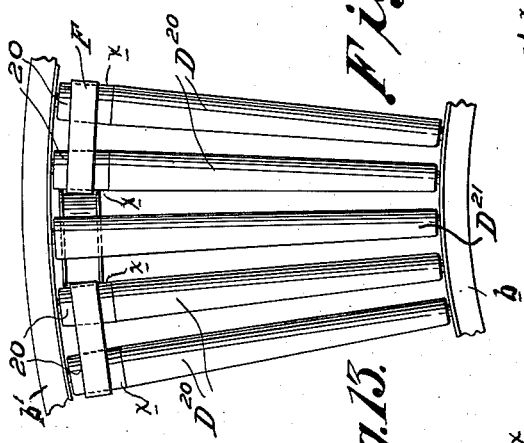
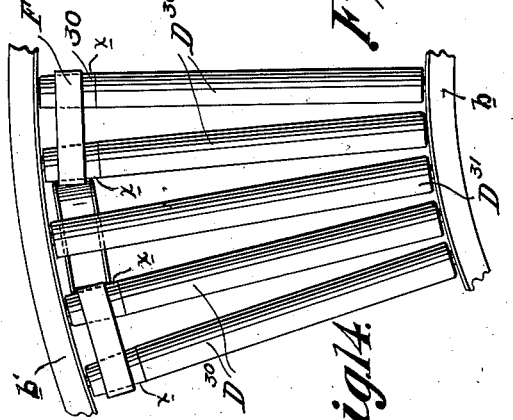
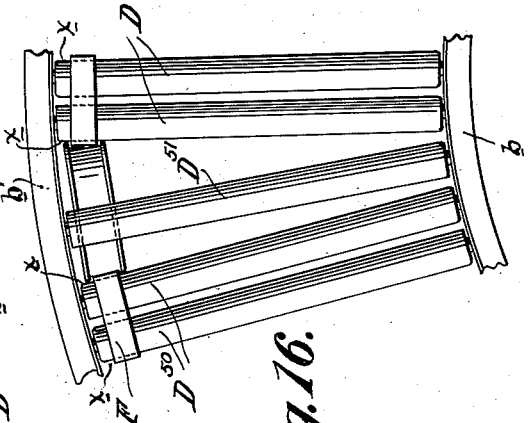
Inventor
William K. Stokes
By C. J. Stockman
Attorney Patented Sept. 22, 1936

2,055,053

UNITED STATES PATENT OFFICE 2,055,053

LIVE ROLLER CONVEYER

William Kenneth Stokes, Cincinnati, Ohio, assignor to The Alvey-Ferguson Company, Cincinnati, Ohio, a corporation of Ohio Application August 8, 1932, Serial No. 627,964

22 Claims. (Cl. 198—127)

This invention relates to certain improvements in the type of conveyers whose beds are formed of live and dead load supporting rollers arranged in an interspersed relationship. It will be understood that conveyers of the type hereinbefore referred to are arranged in a substantially level position and that the load supporting rollers whether "live", or "dead", are mounted to have rotative movements about stationary horizontal axes. It will also be understood that the term "live rollers" refers to those rollers which are driven by power derived from a suitable source and act to propel the loads over the bed, and that the term "dead rollers" refers to rollers of non-power nature, namely, to idler rollers which are employed as friction-reducing load supports between the live rollers.

One of the important purposes of the invention is to provide a conveyer, or conveyer section, whose bed includes load supporting live rollers and load supporting dead rollers relatively arranged to propel articles around a curve in an orderly fashion, that is, at a uniform speed and hence without any liability of one of the conveyed articles interfering with or bumping against or being bumped by, another, even when the articles being conveyed are of varying weights and sizes.

Another important purpose of the invention is to provide a conveyer, or conveyer section, whose bed includes load supporting live rollers which derive their load propelling power from a narrow belt which passes around the upper surfaces of the rollers in a position in which it will be free from engagement with the load and hence not subject to excessive wear although directly engaged with said live rollers.

A further important purpose of the invention is to provide a conveyer, or conveyer section, comprising load supporting live rollers and load supporting idler rollers arranged in an interspersed relationship in which the live rollers are driven by a narrow belt whose working run passes around the upper surfaces of the live rollers and around the undersurfaces of guiding rollers arranged underneath the idler rollers.

Still another important purpose of the invention is to provide a curved conveying section whose bed is composed of live and dead load supporting rollers and which section includes a driving belt which is so guided and tensioned and is so correlated with the load supporting rollers as to cause articles to be conveyed in an orderly fashion around the curve by power applied by the belt directly to the live rollers.

Yet another important purpose of the invention is to provide a conveyer composed of straight and curved sections relatively arranged to deliver loads from one to the other and in which the beds are formed of live and dead load supporting rollers, and in which, moreover, each section includes a driving belt which applies power directly to the live rollers, said conveyer further including means for applying power to one of said belts and means for transmitting power from the latter belt to the other.

Other purposes of the invention will become apparent as the description proceeds.

The foregoing purposes are secured from the construction illustrated in the accompanying drawings and which construction embodies certain novel features of construction of the parts and certain novel combinations and correlations of elements substantially as hereinafter described and particularly set forth in the appended claims.

In the accompanying drawings exemplifying preferred embodiments of the invention and wherein similar characters of reference denote corresponding parts in the several views:

Fig. 1 is a fragmentary plan view showing a part of a conveyer comprising straight sections and a curved section, arranged between the straight sections;

Fig. 2 is a plan view of the curved section of a conveyer on a larger scale than the preceding figure;

Fig. 3 is a fragmentary plan view of a straight section of the conveyer on a larger scale than Fig. 1;

Fig. 4 is a side elevation of said straight section;

Fig. 5 is a transverse section on the line 5—5 of Fig. 2;

Fig. 6 is a transverse section on the line 6—6 of Fig. 3;

Fig. 7 is a fragmentary side view particularly intended to show one of the guiding and tensioning rollers for the working run of the driving belt and its position relatively to the corresponding live and dead rollers, being a view of the parts shown between 7—7 of Fig. 2, for example;

Fig. 8 is a bottom plan view of the same parts shown in Fig. 7;

Fig. 9 is a section on the line 9—9 of Fig. 2, looking in the direction of the arrow;

Fig. 10 is a section on the line 10—10 of Fig. 2;

Fig. 11 is a section on the line 11—11 of Fig. 2; and

Figs. 12, 13, 14, 15 and 16 are fragmentary views showing different forms and relative arrangements of rollers which may be employed in the curved section of the conveyer in lieu of the particular form and arrangement shown in Figs. 1 and 2.

Conveyers of the type to which the instant invention relates usually comprise one or more straight sections, as A, and one or more curved sections, as B, variously arranged in operative relationship with each other to transfer the goods along defined paths laid out in accordance with particular requirements in given installations.

These conveyers include appropriate frames having longitudinal members, respectively arranged at the inner and outer sides thereof, by which the live and dead rollers, which conjointly constitute the load supporting beds, are supported. In the accompanying drawings the side members of the straight sections are marked $a$, $a'$ and the side members of the curved section are marked $b$, $b'$ and all of said members are preferably of angle iron formation. It will be noticed that the outer side member $b'$ of the curved section B, as well as the inner side member $b$ of said section, is characterized by an absence of any vertical corners or angles, said outer member being continuously curved throughout its length except at its ends, which are straight or flattened to form continuations of the corresponding side members of the straight conveyers between which the curved section is arranged, and gradually merges into said straight or flattened ends. The rollers in the straight section are marked C and $C^1$—C designating the live rollers and $C^1$ the dead or idler rollers. The rollers in the curved section are marked D, $D^1$, $D^2$ and $D^3$—D and $D^2$ designating live rollers and $D^1$ and $D^3$ designating dead or idler rollers. The live rollers C of the straight section are driven by a belt E and the live rollers D and $D^2$ of the curved section are driven by a belt F. These rollers are all load-carrying rollers, and the live rollers C, D and $D^2$ receive power directly from the belts E and F and transmit the same directly to the goods carried.

The straight and curved sections of the conveyer are each provided with a series of idler pulleys G suitably supported from the frames thereof and arranged in a lower plane than the live and dead rollers. The straight section A is also provided at its opposite ends with idler pulleys $G^1$ and $G^2$ and at an appropriate place in its length with a driving pulley $G^3$. The end of the curved section B at which the power which drives the belt F is arranged extends in a straight line and said curved section is provided at its opposite ends with idler pulleys $G^4$ and $G^5$ and at a suitable place in relation to its straight end portion with a driving pulley $G^6$. Other pulleys $G^7$, $G^8$ and $G^9$ are provided within the curved portion of the section B and are respectively mounted on vertical axes and so positioned that the pulley $G^8$ will be between and out of line with the pulleys $G^7$ and $G^9$.

The pulleys G of both sections A and B are engaged by the working runs of the belts E and F. The pulleys $G^1$ and $G^2$ of the straight section A are engaged by the returning run of the belt E; and the pulleys $G^4$, $G^5$, driving pulley $G^6$ and pulleys $G^7$, $G^8$ and $G^9$ of the curved section B are engaged by the returning run of the belt F, which belt is twisted between the pulleys $G^4$ and $G^7$ and again between the pulleys $G^9$ and $G^5$. The driving pulley, $G^3$, of the straight section may be arranged in any preferred position along said section and may be engaged by either the working or returning run of the belt E, whichever is proper, according to its position.

The live rollers C of the straight section A and also the live rollers D, $D^2$ of the curved section B, are preferably arranged in sets or groups and these sets or groups alternate with dead rollers $C^1$ of the straight section and $D^1$, $D^3$ of the curved section. There may be one or more dead rollers, as preferred, between each two successive sets or groups of live rollers. In the illustrated embodiment of the invention, the live rollers, C, are arranged in groups of two and there is one idler or dead roller $C^1$ between each two of said groups. In the straight portion at one end of the curved section B the live rollers, D, are shown as arranged in one group of three rollers and a second group consisting of two rollers, and these two groups are separated from each other by a group of three idler or dead rollers. In the curved portion of said section B the live rollers, $D^2$, are shown as arranged in groups of two and there is an idler or dead roller $D^1$ between the second group of live rollers in the straight portion and the first group of live rollers in said straight portion, and additional idlers or dead rollers $D^1$ respectively between the remaining groups of live rollers.

The working runs of the belts in both the straight and curved sections of the conveyer, travel over the upper surfaces of the sets or groups of live rollers and around the undersurfaces of the pulleys G, from end to end of the respective sections. In the illustrated embodiment the working run of the belt E also engages the driving pulley $G^3$. The returning run of the belt E is around the pulleys $G^1$ and $G^2$ and to the upper surface of the live roller at the receiving end of said section, where it again becomes a working run. The returning run of the belt F engages the pulleys $G^4$, $G^7$, $G^8$, $G^9$ and $G^5$, in the order named, and from the last named pulley, said belt travels upward and over the upper surfaces of the group of live rollers at the corresponding end of the curved section and thence downward around the undersurface of the drive pulley $G^6$ and up again to the next set or group of live rollers and thence downward around the corresponding pulley G, and so on.

It will be noticed that the belts E and F are of narrow width and, as here shown, engage the live rollers at one end only of each of the latter. It will also be noticed that each pulley G is arranged underneath the corresponding dead roller and that its diameter is substantially equal to the space between the two successive groups or sets of live rollers which are separated from each other by said dead roller. Thus it will be seen that each belt in its travel from one set or group of live rollers to the next set or group in the order of its travel moves in a substantially vertical downward path and around the undersurface of the corresponding pulley G and thence in a substantially vertical upward path to the upper surface of said next set or group or live rollers: stretching and wear of the belt is thus reduced to a minimum.

All of the rollers C and $C^1$ of the straight section A and all of the rollers D and $D^1$ in the straight portion of the curved section B are of the same diameter from end to end and have their longitudinal axes in a parallel relationship.

Various typical forms and arrangements of rollers adapted to convey articles around a curved path in an orderly fashion by power applied directly to one end only of each live roller by an endless belt or the like, of relatively narrow width are shown in the accompanying drawings, as follows:—

In Figs. 1 and 2 all of the rollers $D^2$ and $D^3$ in the curve of the conveying section B extend radially from the inner side member $b$ of the frame and each is of the same diameter throughout, with the exception of one live roller of each set or group of live rollers, which has its driving end, $d$, tapered; in Fig. 12 an arrangement is suggested in which all the live rollers $D^{10}$ and all the dead rollers $D^{11}$, including the driving ends 10 of the live rollers, are tapered throughout in the same direction, and the longitudinal axes of the live rollers of each set or group are parallel with each other and in a diagonal relationship to the longitudinal axes of the dead rollers, $D^{11}$, between successive sets or groups of live rollers; in Fig. 13 an arrangement is suggested in which each live roller has its body, $D^{20}$, tapered and its driving end 20 also tapered, but in a direction the opposite to the taper of the body $D^{20}$, and the dead roller $D^{21}$ between successive sets or groups of live rollers is tapered throughout in the same direction, and all of these rollers, both live and dead, extend radially from the inner side member $b$ of the frame; Fig. 14 suggests an arrangement in which all of the live rollers have their bodies $D^{30}$ of the same diameter throughout and their driving ends 30 tapered, and in which the dead roller, $D^{31}$, between successive sets or groups of live rollers are each of the same diameter throughout, and all of the rollers, both live and dead, extend radially from the inner side member $b$ of the frame; Fig. 15 suggests an arrangement in which all live rollers have their bodies $D^{40}$ tapered in the same direction and the driving end 40 of one of said rollers of each set or group is tapered while the driving end 40' of the other live roller of each set or group is straight, and in which the dead rollers $D^{41}$ between successive sets or groups of live rollers are tapered throughout, and all of the rollers, both live and dead, extend radially from the inner side member $b$ of the frame; Fig. 16 suggests an arrangement in which each live roller, $D^{50}$, and each dead roller, $D^{51}$, between successive sets or groups of live rollers, is of the same diameter throughout, and in which the live rollers of each set or group have their axes parallel with each other and diagonal to the axes of the dead rollers.

It will be noticed that in all of these various forms or arrangements the outer faces, marked $x$ in all figures, of the driving ends of the live rollers of each set or group—whether both driving ends of each set or group be tapered or be non-tapered or one be tapered and the other non-tapered—are parallel with each other, whereby the belt is kept in the position upon the driving ends of the rollers in which its engagement with said ends is most effective.

Appropriate pulleys of the sections A and B, as the pulley $G^2$ of the straight section A and the pulley $G^8$ of the curved section are adjustable by suitable means to take up the slack in the corresponding belts E and F, respectively, the take-up means illustrated being preferred since they possess important advantages.

As shown best in Figs. 3 and 4, the pulley $G^2$ is mounted on a shaft 20 which is carried by a substantially U-shape bearing through whose side arms 21 the ends of said shaft extend and said bearing is slidably mounted within an open bearing-supporting frame comprising side members 22 which extend longitudinally of the conveyer and whose front and rear ends are connected with each other by cross members 23. This bearing-supporting frame is supported by arms 24 whose upper ends are fixedly secured by any suitable means to the frame of the section A. The ends of the shaft 20 extend through elongated openings 25 in the side members 22 of the bearing-supporting frame, and appropriate means, as nuts 26, are provided to hold the shaft and bearing and pulley against lateral displacement. The side arms 21 of the bearing have their forward ends connected with each other by a transverse member 27 and an adjusting bolt 28, having at its inner end a head 29 in engagement with the inner surface of said transverse member 27, extends through the same and also through the forward transverse member 23 of the bearing-supporting frame and serves to adjust the bearing and the pulley $G^2$ forward or rearward, as the case may be, within said frame. The bolt 28 has threaded engagement on opposite sides of the member 23 with appropriate nuts 29' by which it, and consequently, the bearing and pulley, are held in adjusted position. This adjustment, of course, is longitudinal of the section A.

The adjustment of the pulley $G^8$ in the curved section B of the frame is transverse of said section and the preferred means by which said pulley is adjusted is similar in principle to that employed in relation to the pulley $G^2$, as will be seen upon reference to Fig. 10. It will be noticed, however, that the shaft 30, upon which said pulley $G^8$ is mounted, extends vertically through the upper and lower horizontal arms 31 of a bearing and also through upper and lower horizontal members 32 of a bearing-supporting frame, which frame includes appropriate supporting members 33 suitably secured to the frame of the section B. The bearing is slidably mounted between the members 32 of the bearing-supporting frame and the shaft 30 extends at its opposite ends through elongated openings 34 in said members 32. An adjusting bolt 35 extends through one of the supporting members 33 and through a member 36 which connects the arms 31 of the bearing with each other, and said bolt is provided at its inner end with a head 37 which engages the inner surface of the member 36 and with nuts 38 arranged on opposite sides of the member 33, said head and nuts cooperating to permit the bolt to be adjusted and in its adjustment to impart sliding movement to the bearing and pulley $G^8$ within the bearing-supporting frame, and also to hold said pulley and its bearing in adjusted position.

The pulleys $G^7$ and $G^9$ for the returning run of the belt F, and which pulleys, as shown, are respectively arranged in advance of and rearward of the adjusting pulley $G^8$, may be non-adjustable transversely of the conveyer. An appropriate means by which each is supported is shown in Fig. 9 and includes a vertical shaft 40 carried by a bracket 41 and extending at its upper end into a socket 42 and near its lower end through a sleeve 43. The pulley $G^7$, or $G^9$, is rotatably mounted on the lower end of the shaft 40, between the sleeve 43 and a head 44 fixedly held on the lower end of the shaft. If preferred, the head 44 may be in the form of a nut which is adjustable upon the shaft to conveniently assure proper horizontal position of these pulleys relatively to the other pulleys engaged with the returning run of the belt.

In order to provide for proper alignment of the idler pulleys G, the shafts of these pulleys are preferably mounted in bearings which permit the shafts to be shifted either horizontally or vertically, at either end independently of the other end. Figs. 7 and 8 show an adjustable mounting applied to one of said pulleys and which may be duplicated with reference to any or all of the others. Said mounting comprises a pair of inner members, 45, mounted on opposite sides of the pulley G and through which the ends of the shaft, 46, of said pulley extend. These inner members are respectively adjustably secured to a pair of outer members, 47, by bolts, 48, or equivalent fastening elements. These bolts, 48, are arranged near the ends of the members 45 and extend through horizontally arranged slots, 49, in the outer members 47. As here shown they also extend through vertically arranged slots 50 in the inner members 45, and said slots 50 are disposed in an intersecting relationship with the slots 49. Accordingly, it will be seen that either shaft-carrying member 45 may be adjusted both vertically and horizontally relatively to the members 47. The members 47 are free from direct connection with the shaft 46, since said shaft 46 does not extend into or through said members, but has indirect connection with the shaft through the medium of the members 45 and bolts 48. Said members 47 extend at their opposite ends beyond the pulley G and are secured to each other by bolts 51 and they are held in position relatively to the frame by suitable means, as brackets 52.

These pulleys G are preferably made of aluminum or other light weight material and in practice are provided with anti-friction bearings so as to be very free running and thus add little unnecessary pull to the driving belt.

All of the pulleys G are flanged to form channels through which the belts travel.

The frame of each conveyer section A, B is provided at each of its sides with a guard as is customary in conveyers. These may be of any suitable construction—Figs. 5 and 6 illustrating two typical forms.

Each guard shown in Fig. 6 consists of a rail which is L-shaped in cross section, one of said rails being marked 60 and the other 61. They are supported at intervals along their respective lengths by suitable arms, 62 and 63, which extend upward from the corresponding side members of the frame. The arms 63, as suggested in Fig. 6, are bent to position the working surface of the rail 61 in such relationship to the belt E that it will confine lateral movement of the goods into a position in which said goods will not come into contact with said belt.

In Fig. 5 each guard is in the form of a plate or sheet whose upper end is provided with an outwardly extending flange and whose lower edge extends to a place adjacent the upper surfaces of the load supporting rollers. One of said guards is marked 60' and the other 60''. The guard 60' is supported at intervals along its length by upwardly extending arms 62' and the guard 60'' is supported at intervals along its length by arms 63' which are suitably bent to position the guard 60'' in such relation to the belt that contact of said belt with the goods conveyed will be prevented.

As hereinbefore stated, any appropriate means for imparting power to the driving pulleys may be resorted to. In any conveyer which includes separate straight and curved sections, as A and B, for example, it is preferred to connect the driving means with the driving pulley of one section directly and to transmit the power from said pulley to the driving pulley of the other section by appropriate means. Fig. 1 shows a source of power, preferably an electric motor M, connected by a chain N with a suitable worm or gear reduction unit O, which transmits power to a drive shaft P, which shaft is connected to the drive pulley $G^3$ (Fig. 4) of the section A and also with the driving pulley $G^6$ (Fig. 11) of the section B, the connection between said shaft and the driving pulley $G^6$ including a sprocket chain Q. It is preferred, in practice, to provide a casing R, as suggested in Fig. 5, to protect driving portions of the conveyer. This casing may extend throughout any part of the length of either or both of said sections A and B and preferably is arranged to protect the driving mechanism at the junction of the two sections.

Having thus described the invention what I believe to be new and desire to secure by Letters Patent, is:—

1. A conveyer comprising a frame including longitudinal members which are spaced apart transversely of the conveyer and are arranged at opposite sides of the latter, a series of live and dead load supporting rollers disposed in substantially the same horizontal plane and in an interspersed relationship, each of said rollers extending across the conveyer from one of said frame members to the other and each of said live rollers having a driving end arranged inward of the corresponding longitudinal frame member, idler pulleys arranged substantially underneath the dead rollers, a relatively narrow flat driving belt having travelling engagement with the upper surfaces of the driving ends of the live rollers and passing thence around the undersurfaces of said pulleys and out of contact with the dead rollers, guards at opposite sides of the conveyer and guard supporting arms extending upward from the corresponding longitudinal members of the frame, each of said arms at one side of the conveyer being bent inwardly between its ends to overlie the driving belt engaged with the upper surfaces of the driving ends of the live rollers and the corresponding guard being secured to the upper end portions of the latter guard supporting arms to thereby position it inward with relation to the driving belt.

2. A conveyer comprising a load supporting bed, a substantially flat driving belt and an idler pulley for the working run of the belt: said bed including a plurality of groups of load supporting live rollers having driving portions the outer sides of which in each group are substantially parallel with each other and load supporting dead rollers between successive groups of said live rollers and whose longitudinal axis is in a non-parallel relationship with the longitudinal axes of the live rollers of said groups; said driving belt being of narrow width relatively to the length of the load supporting rollers and travelling over and in engagement with the upper surfaces of the live rollers of each group and downward and in engagement with the undersurfaces of the respective idler pulleys between successive groups; and said idler pulleys being arranged relatively to the outer sides of the driving portions of successive groups of live rollers to cause the belt in its travel between said groups to engage said side surfaces of the live rollers.

3. A curved conveyer section whose bed is formed of a series of load supporting rollers disposed in substantially the same horizontal plane, idler pulleys beneath said bed, a driving belt whose course of travel is upon the upper surfaces of successive groups of said load supporting rollers and underneath the lower surfaces of the idler pulleys between successive groups of said rollers and out of contact with other rollers arranged between each two of said groups, whereby said bed is composed of groups of live rollers with a dead roller interposed between each two of said groups, said dead rollers and groups of live rollers having relatively non-parallel longitudinal axes and said live rollers of each group having driving end portions integral with the bodies thereof and whose outer sides are parallel with each other, and said idler pulleys being arranged to cause the belt in its travel between successive groups of live rollers to move in substantially vertical parallel planes and to be held in engagement with said outer sides of the driving portions of the live rollers.

4. A conveyer comprising two sections mounted end to end and operative to deliver a load from one to the other, one of said sections being straight throughout its length and the other being straight at its end adjacent the straight section and being curved in another part of its length, said straight section and said straight part of the other section having load supporting beds provided with interspersed live and dead rollers whose longitudinal axes are substantially parallel with each other and said other section having its bed provided with interspersed live and dead rollers having parallel longitudinal axes in the straight part thereof and interspersed live and dead rollers having non-parallel longitudinal axes in the curved part thereof, the live rollers of both of said sections being arranged in groups of two or more and the dead rollers of both of said sections being arranged intermediate successive groups of live rollers and said live and dead rollers being relatively positioned to cause the load to be at all times engaged by one or more live rollers, whereby the load will not be brought to a state of rest by engagement of a dead roller therewith; relatively narrow flat driving belts for the respective sections, each travelling directly across the upper surfaces of the groups of live rollers and directly from one roller of each group to the next roller of the same group and passing downward and out of contact with the dead rollers between successive groups of live rollers in the respective sections, guiding pulleys for the working runs of the belts, arranged beneath the dead rollers and around the undersurfaces of which said driving runs of the belts pass from one group of live rollers to the next, idler guiding rollers for the returning runs of the belts of the respective sections, a driving means imparting power to one of said belts and driving connections between said means and the belt of the next section for transmitting power to the latter.

5. A curved conveyer section comprising a frame, a plurality of groups or sets of live load supporting rollers extending transversely of the frame, dead load supporting rollers arranged between successive groups or sets of live rollers, each group or set of live rollers including a roller having a tapered driving end, and a driving belt whose working run directly engages the driving ends only of the successive groups or sets of live rollers and is guided to move out of contact with the dead rollers in its travel from one group or set of live rollers to the next.

6. A curved conveyer section according to claim 5, in which the live and dead rollers extend radially from one side of the frame to the other.

7. A curved conveyer section according to claim 5, in which the driving end of only one live roller of each group or set is tapered.

8. A curved conveyer section according to claim 5, in which the driving ends of both live rollers of each group or set is tapered.

9. A curved conveyer section according to claim 5, in which the load supporting rollers extend radially from one side of the frame to the other and the driving ends of the rollers of each group or set are tapered.

10. A curved conveyer section according to claim 5, in which the outer sides of the driving ends of the live rollers of each group or set are parallel with each other.

11. A curved conveyer section comprising a frame, a plurality of groups or sets of live load supporting rollers extending transversely of the frame, the rollers of each group or set having their axes arranged parallel with each other and said groups or sets being relatively diagonal one to another, dead load supporting rollers between successive groups or sets of the live rollers, and a driving belt whose working run directly engages the driving ends only of the groups or sets of live rollers and is guided to move out of contact with the dead rollers in its travel from one group or set of live rollers to the next.

12. A conveyer section comprising a frame, live and dead load supporting rollers arranged in an interspersed relationship and extending transversely of the frame, idler pulleys below the plane of the load supporting rollers, shafts upon which said idler pulleys are mounted, supporting means for said shafts, means by which either end of the shafts may be adjusted in up and down and lateral directions, to thereby correspondingly adjust the idler pulleys, a relatively narrow endless driving belt whose working run directly engages the upper surface of each live roller and passes around the undersurface of the idler pulleys in its passage between the live rollers, and guide means for the returning run of the belt.

13. A conveyer section comprising a frame, a bed composed of live and dead load supporting rollers arranged in an interspersed relationship transversely of the frame, idler pulleys mounted to have rotative movement upon horizontal axes below said bed, adjustable supporting means for the idler pulleys, a relatively narrow endless driving belt whose working run directly engages the upper surface of each live roller and passes around the undersurfaces of the idler pulleys in its passage between the live rollers, and guiding means for the returning run of the belt: said supporting means for the idler pulleys comprising inner members in which the shafts of the pulleys are mounted, outer members, said inner and outer members having slots of which those of the inner members are arranged in an intersecting relationship with those of the outer members, and releasable holding elements which extend through the slots in the inner and outer members.

14. A curved conveyer section comprising inner and outer supporting frame members, a load supporting bed composed of live and dead rollers extending transversely of the conveyer from one of said frame members to the other, said live rollers being arranged in groups and each having an integral driving end and said dead rollers being arranged between successive groups of live rollers and having their respective longitudinal axes in non-parallel relation with the axes of the dead rollers, idler pulleys respectively mounted underneath the dead rollers with their lateral peripheral surfaces substantially in vertical alignment with the side surfaces of the driving ends of the end rollers of two successive groups, an endless driving belt of narrow width relatively to the length of the load supporting rollers and whose working run travels in direct driving engagement with the upper surfaces of the driving ends of the groups of live rollers and in substantially vertical parallel paths in direct engagement with the side surfaces of the driving ends of the end rollers of said groups and around the underneath surfaces of the idler pulleys, and means operatively related to the returning run of the belt to guide and tension the same.

15. A curved conveyer section according to claim 14 in which the outer side faces of the driving ends of end live rollers of each group are parallel with each other and the lateral peripheral surfaces of the idler pulleys are in vertical alignment with said side surfaces.

16. A curved conveyer section according to claim 14 in which all of the rollers extend radially from the inner frame member and the driving end of one live roller of each group is tapered.

17. A curved conveyer section according to claim 14 in which all of the rollers extend radially from the inner frame member and the driving end of one live roller of each group is tapered and the driving end of another roller of each group is substantially cylindrical and the side surfaces of said driving ends of both rollers are parallel with each other.

18. A curved conveyer section according to claim 14 in which the driving ends of the live rollers of each group are tapered and have their outer side faces parallel with each other.

19. A curved conveyer section according to claim 14 in which all of the rollers extend radially from the inner frame members and the driving ends of the live rollers of each group are tapered and have their side faces parallel with each other.

20. A curved conveyer section according to claim 14 in which the longitudinal axes of the live rollers of each group are parallel with each other and non-parallel with respect to the dead rollers.

21. A conveyer comprising horizontal straight and curved sections, said curved section having a straight end forming a continuation of the corresponding end of the straight section and each section having load-supporting live and dead rollers throughout its length and also having idler pulleys below its said rollers, driving belts for the respective sections, each belt having its working run directly engaged with the upper surfaces of the live rollers and with the undersurfaces of the idler pulleys, guiding means for the returning runs of the said belts, means, including a driving pulley for applying power to one of said belts, and means, including a driving pulley and power transmitting connection between said pulley and the first mentioned driving pulley, for driving the belt of the curved section from the driving means for the belt of the straight section, the live rollers of each section being arranged in groups or sets, the dead rollers being arranged between successive groups or sets of the live rollers and the driving pulleys being mounted on shafts which are independent of said live and dead rollers and are respectively arranged underneath dead rollers adjacent to but spaced from the ends of the straight portions of the conveyer.

22. A curved conveyer section comprising inner and outer supporting frame members, live rollers arranged in groups having converging axes, idler pulleys below the live rollers, flat belt means in contact with the idler pulleys and with a top and sides of each of two rollers in a group, the opposite belt contacting side portions being substantially parallel to each other.

WILLIAM KENNETH STOKES.